United States Patent
Feilner et al.

(10) Patent No.: US 11,224,240 B2
(45) Date of Patent: Jan. 18, 2022

(54) DEVICE AND METHOD FOR PASTEURIZING AND FILLING MEDIUM INTO CONTAINERS

(71) Applicant: Krones AG, Neutraubling (DE)

(72) Inventors: Roland Feilner, Regensburg (DE); Torsten Runge, Straubing (DE); Stefan Hoeller, Thalmassing (DE); Thomas Oehmichen, Regensburg (DE)

(73) Assignee: Krones AG, Neutraubling (DE)

( * ) Notice: Subject to any disclaimer, the term of this patent is extended or adjusted under 35 U.S.C. 154(b) by 263 days.

(21) Appl. No.: 15/980,312

(22) Filed: May 15, 2018

(65) Prior Publication Data
US 2019/0069581 A1  Mar. 7, 2019

(30) Foreign Application Priority Data

Sep. 4, 2017 (DE) ...................... 10 2017 215 436.5

(51) Int. Cl.
*A23L 3/22* (2006.01)
*A23L 2/46* (2006.01)
(Continued)

(52) U.S. Cl.
CPC .................................... *A23L 3/22* (2013.01);
*A23L 2/46* (2013.01); *A23L 3/001* (2013.01);
*A23L 3/003* (2013.01);
(Continued)

(58) Field of Classification Search
CPC . A23C 3/033; A23L 3/22; A23L 21/10; A23L 21/12; A23L 29/30; A23L 29/37;
(Continued)

(56) References Cited

U.S. PATENT DOCUMENTS 2,897,082 A    7/1959  Kaiser
4,194,014 A *  3/1980  Hermans ................ A23C 3/037
                                                              426/231
(Continued)

FOREIGN PATENT DOCUMENTS

CN    101843350 A    9/2010
CN    102008895 A    4/2011
(Continued)

OTHER PUBLICATIONS

Chinese Office Action dated Apr. 2, 2020, on application No. 201810401029.9.
(Continued)

*Primary Examiner* — Ibrahime A Abraham
*Assistant Examiner* — Gyounghyun Bae
(74) *Attorney, Agent, or Firm* — Lowenstein Sandler LLP

(57) ABSTRACT

A device for pasteurizing and filling medium into containers includes a short time heating system for pasteurizing the medium, a single buffer container downstream of the short time heating system for receiving the medium, and a rotary filling device downstream of the buffer container. The filling device is connected to the buffer container in a buffer-free manner and pipes and/or one or more rotary distributors are disposed between the filling device and the buffer container. A method for pasteurizing and filling medium into containers, where filling the containers with the medium is performed by way of a device in a buffer-free manner using a filling device, includes: pasteurizing the medium in the short time heating system, buffering the pasteurized medium in the buffer container, and filling the pasteurized medium into the containers. The pasteurized medium is transported in a buffer-free manner from the buffer container to the filling device.

20 Claims, 2 Drawing Sheets

(51) Int. Cl.
  *A23L 3/00* (2006.01)
  *B67C 3/22* (2006.01)
  *B67C 3/02* (2006.01)
  *C12H 1/18* (2006.01)
  *B65B 31/04* (2006.01)
  *B65B 3/04* (2006.01)
(52) U.S. Cl.
  CPC .............. *B65B 31/042* (2013.01); *B67C 3/02* (2013.01); *B67C 3/22* (2013.01); *B67C 3/225* (2013.01); *C12H 1/18* (2013.01); *A23V 2002/00* (2013.01); *B65B 3/04* (2013.01)
(58) Field of Classification Search
  CPC ........ A23L 33/10; A23L 33/125; A23L 33/17; B67D 1/07; A23V 2002/00; B01D 61/08; B01D 61/10; B01D 61/12; B01D 61/145; B01D 61/18; B01D 63/024; B01D 69/02; B01D 2319/06; B01D 2325/36; B01D 2325/38; B01D 2325/48; C02F 1/441; C02F 1/283; C02F 1/42; C02F 1/505; C02F 2307/04; C02F 1/003; C02F 1/444; B65B 3/04; B65B 55/12; B65B 2220/14; B67C 7/204; B67C 3/22; B67C 3/282; B67C 3/023; B67C 3/026; B67C 3/208
  See application file for complete search history.

(56) References Cited

U.S. PATENT DOCUMENTS

| | | | | |
|---|---|---|---|---|
| 4,583,453 | A * | 4/1986 | Torterotot | B01F 3/088 |
| | | | | 99/455 |
| 4,724,079 | A | 2/1988 | Sale et al. | |
| 4,872,974 | A | 10/1989 | Hirayama et al. | |
| 5,224,526 | A | 7/1993 | Mette et al. | |
| 5,360,055 | A * | 11/1994 | Hup | A23C 3/033 |
| | | | | 165/66 |
| 5,443,857 | A * | 8/1995 | Arph | A23C 3/037 |
| | | | | 426/522 |
| 5,503,064 | A * | 4/1996 | Scheel | A23B 5/0055 |
| | | | | 422/117 |
| 5,846,583 | A * | 12/1998 | Gentner | A23C 3/033 |
| | | | | 426/231 |
| 6,190,718 | B1 * | 2/2001 | Eek | A23B 7/045 |
| | | | | 426/399 |
| 8,505,268 | B2 | 8/2013 | Stoiber et al. | |
| 8,701,722 | B2 * | 4/2014 | Clusserath | B67C 3/22 |
| | | | | 141/98 |
| 9,090,091 | B2 | 7/2015 | Till | |
| 9,249,005 | B2 | 2/2016 | Haeusimann | |
| 9,644,938 | B2 | 5/2017 | Noll et al. | |
| 2003/0049356 | A1 * | 3/2003 | Nielsen | A23L 3/003 |
| | | | | 426/522 |
| 2006/0162466 | A1 * | 7/2006 | Wargo | G01F 1/50 |
| | | | | 73/861.63 |
| 2007/0193652 | A1 * | 8/2007 | Till | F16J 15/40 |
| | | | | 141/144 |
| 2008/0314807 | A1 | 12/2008 | Junghanns et al. | |
| 2010/0193072 | A1 * | 8/2010 | Sollner | B67C 3/02 |
| | | | | 141/82 |
| 2010/0313959 | A1 * | 12/2010 | Termansen | B67C 3/026 |
| | | | | 137/1 |
| 2011/0056894 | A1 | 3/2011 | Scheu | |
| 2011/0085946 | A1 * | 4/2011 | Clusserath | A23L 3/205 |
| | | | | 422/292 |
| 2011/0097469 | A1 * | 4/2011 | Clusserath | A23L 3/001 |
| | | | | 426/521 |
| 2011/0146880 | A1 | 6/2011 | Krämer et al. | |
| 2011/0214779 | A1 | 9/2011 | Goldman et al. | |
| 2011/0277879 | A1 | 11/2011 | Clusserath | |
| 2011/0300230 | A1 * | 12/2011 | Peterson | C02F 1/20 |
| | | | | 424/600 |
| 2012/0000492 | A1 * | 1/2012 | Katzenbacher | B08B 9/08 |
| | | | | 134/26 |
| 2012/0248023 | A1 | 10/2012 | Zacharias et al. | |
| 2013/0029020 | A1 * | 1/2013 | Rewolle | B65B 55/14 |
| | | | | 426/407 |
| 2013/0059055 | A1 * | 3/2013 | Richter | A23C 3/033 |
| | | | | 426/521 |
| 2013/0064952 | A1 * | 3/2013 | Cadeo | A23L 3/003 |
| | | | | 426/521 |
| 2013/0125509 | A1 | 5/2013 | Sowislo et al. | |
| 2014/0174597 | A1 * | 6/2014 | D'Errico | B65B 31/044 |
| | | | | 141/47 |
| 2015/0191337 | A1 * | 7/2015 | Maron | A23L 2/54 |
| | | | | 53/432 |
| 2015/0298467 | A1 | 10/2015 | Cofler | |
| 2015/0313272 | A1 | 11/2015 | Han et al. | |
| 2016/0052189 | A1 * | 2/2016 | Winzinger | B29C 49/12 |
| | | | | 264/524 |
| 2016/0073674 | A1 * | 3/2016 | Adam | A23L 3/003 |
| | | | | 99/403 |
| 2018/0009686 | A1 | 1/2018 | Boyle | |
| 2018/0086618 | A1 * | 3/2018 | Clusserath | B67C 3/06 |
| 2019/0010039 | A1 * | 1/2019 | Clusserath | B67C 3/12 |
| 2019/0230963 | A1 * | 8/2019 | Runge | B65B 55/14 |

FOREIGN PATENT DOCUMENTS

| | | | | |
|---|---|---|---|---|
| CN | 102791611 A | | 11/2012 | |
| CN | 106 731 843 A | | 5/2017 | |
| CN | 108142893 A | | 6/2018 | |
| DE | 2848988 A1 | * | 5/1980 | ............... B67C 3/06 |
| DE | 3148282 A1 | | 6/1983 | |
| DE | 3510412 A1 | | 9/1986 | |
| DE | 4 440 418 A1 | | 5/1996 | |
| DE | 101 64 555 A1 | | 6/2003 | |
| DE | 10 2008 051 791 A1 | | 4/2010 | |
| DE | 10 2009 007 220 A1 | | 8/2010 | |
| DE | 10 2009 009 660 A1 | | 8/2010 | |
| DE | 10 2009 033 810 A1 | | 1/2011 | |
| DE | 10 2009 028 228 A1 | | 2/2011 | |
| DE | 10 2009 040 977 A1 | | 3/2011 | |
| DE | 10 2010 024 114 A1 | | 3/2011 | |
| DE | 102010042624 A1 | | 4/2012 | |
| DE | 10 2011 006 543 A1 | | 10/2012 | |
| DE | 10 2012 105720 A1 | | 1/2014 | |
| DE | 102012105720 A1 | | 1/2014 | |
| DE | 10 2013 217 681 A1 | | 3/2015 | |
| DE | 10 20150208 295 A1 | | 11/2015 | |
| DE | 20 2015 007 209 U1 | | 11/2015 | |
| DE | 10 2014 108 092 A1 | | 12/2015 | |
| EP | 0 470 398 A1 | | 2/1992 | |
| EP | 0470398 A1 | | 2/1992 | |
| EP | 1 240 938 A1 | | 9/2002 | |
| EP | 1240938 A1 | | 9/2002 | |
| EP | 1369379 A1 | | 12/2003 | |
| EP | 2233010 A1 | | 9/2010 | |
| EP | 2 409 949 A1 | | 1/2012 | |
| EP | 2 746 215 A1 | | 6/2014 | |
| GB | 810215 A | | 3/1959 | |
| GB | 1087110 A | * | 10/1967 | ............... B67C 3/06 |
| GB | 2336757 A | | 11/1999 | |
| JP | H08199637 A | | 8/1996 | |
| WO | 2001/019209 A1 | | 3/2001 | |
| WO | 2009/060256 A1 | | 5/2009 | |
| WO | 2010/115510 A2 | | 10/2010 | |
| WO | WO-2011143782 A1 | * | 11/2011 | ............... A23L 3/22 |

OTHER PUBLICATIONS

Search Report for German Patent Application No. 102017215436.5 dated Apr. 4, 2018; 8 pages.
Extended European Search Report for European Patent Application No. 17204711.0 dated May 18, 2018, 7 pages.
English Translation of Chinese Office Action dated Nov. 3, 2020 for Chinese Patent Application No. 201810401029.9, 26 pages.
English Translation of Chinese Office Action dated Jan. 22, 2021, for Chinese Patent Application No. 201810073683.1, 12 pages.

(56) References Cited

OTHER PUBLICATIONS

Zhang Qin et al., "High-rise Building Water Supply and Drainage Project", p. 61, Chongqing University Press, Nov. 2016.
Liu Cheng et al., "Contemporary New Food", p. 362, Beijing University of Technology Press, Dec. 1998.
Chinese Office Action dated Aug. 12, 2021 for Chinese Patent Application No. 201810073683.1.

* cited by examiner

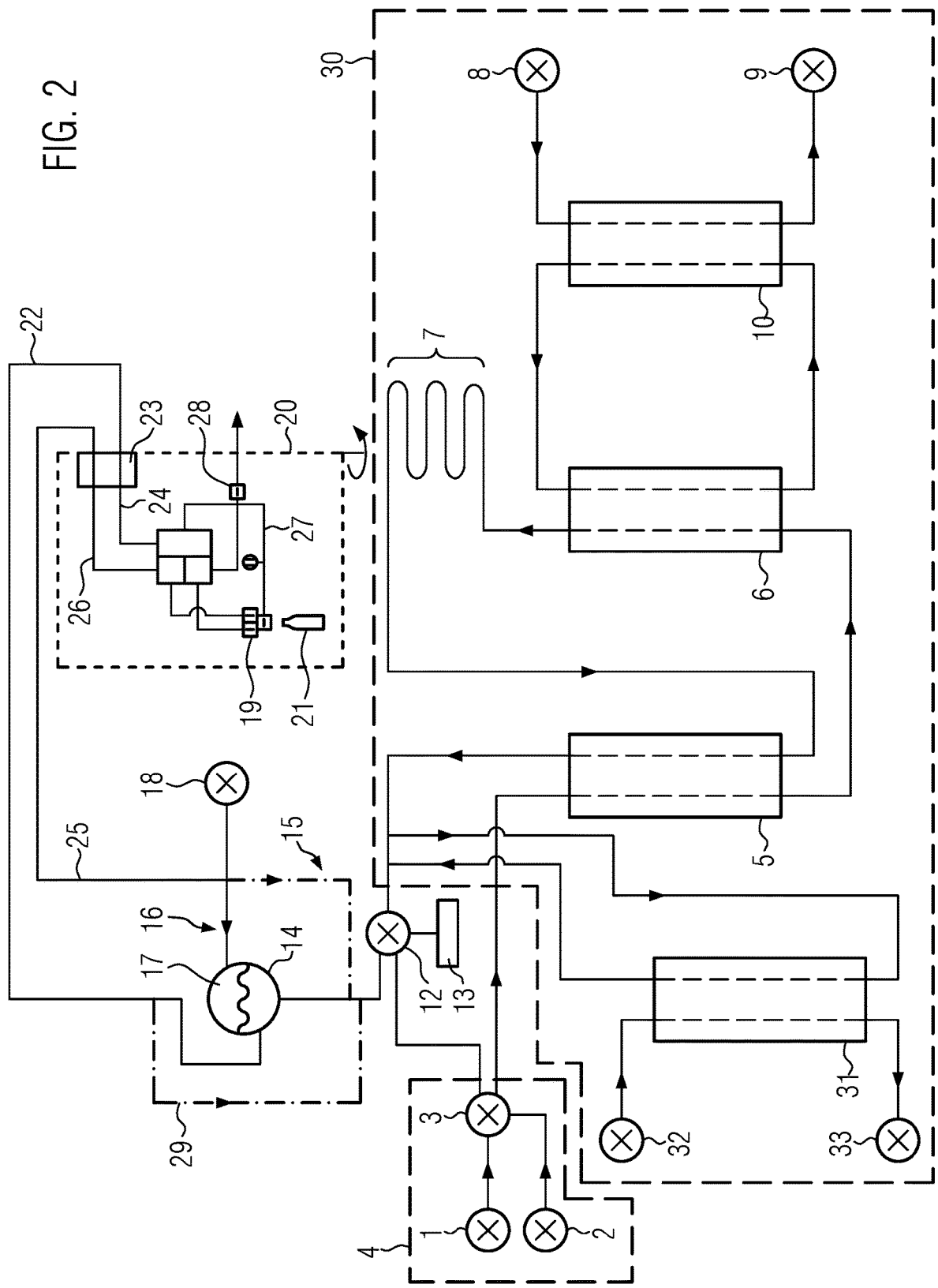

DEVICE AND METHOD FOR PASTEURIZING AND FILLING MEDIUM INTO CONTAINERS

RELATED APPLICATIONS

This Application claims the benefit under 35 U.S.C. § 119(a) of German Patent Application No. 10 2017 205 436.5, filed Sep. 4, 2017, which is incorporated by reference herein.

TECHNICAL FIELD

The present disclosure relates to a device for pasteurizing and filling medium into containers and a method for pasteurizing and filling medium into containers.

BACKGROUND

For microbiological stabilization of medium, such as beverages, substantially liquid food and feed, it is known to generally perform short time heating (pasteurization) of the medium. Media that are not intended for hot-filling can be cooled down after pasteurization and intermediately stored in a buffer tank and fed via supply devices to a filler valve manifold of a filling system. Via a control valve, the medium enters a filler vessel of the filling system, from where the medium is passed to fillers, by way of which containers are filled. The provision of a buffer tank and a filler vessel requires sufficient space to set up a device for pasteurizing and filling medium. In addition, the amount of medium intermediately stored is not insignificant.

GB 810,215 discloses a method for pasteurizing and filling beverages. A consistent beverage flow is passed through a plate pasteurizer, regardless of any disturbances in the filling process. The beverage is passed through the pasteurizer to a filling machine along a main line. If the amount of beverage flowing through the main line exceeds the capacity of the filling machine, then beverage is returned through a bypass line bypassing the pasteurizer. Therefore, an undesirable thermal overload due to the partial double pasteurization of the product pumped back can arise. A pump sends a constant amount of beverage at different pressures through the pasteurizer and the pressure in the filling machine is adjusted by regulating the pressure in a pressure chamber.

DE 10 2009 007 220 A1 discloses a method for operating a pasteurization system having a primary circuit for a medium to be pasteurized and a secondary circuit serving as a heating circuit for heating the medium in the primary circuit.

BRIEF DESCRIPTION OF THE DRAWINGS

Embodiments of the present disclosure are illustrated by way of example, and not by way of limitation, in the figures of the accompanying drawings.

FIG. 2 illustrates a device for pasteurizing and filling medium into containers, according to certain embodiments.

DETAILED DESCRIPTION

Figure 1:
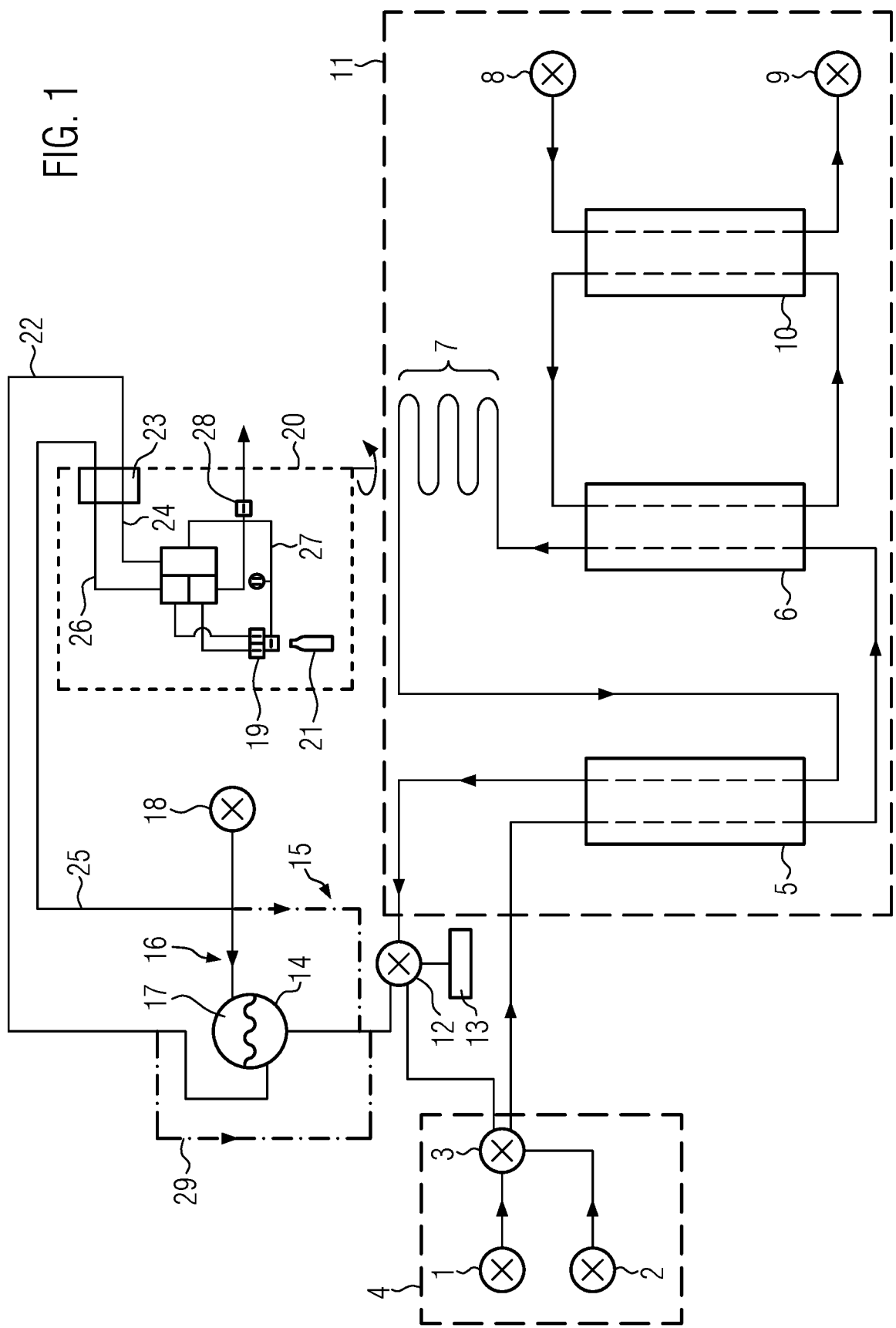
FIG. 1 illustrates a device for pasteurizing and filling medium into containers, according to certain embodiments.

It is an object of certain embodiments of the present disclosure to provide a device and a method for pasteurizing and filling media into containers which enable efficient and inexpensive use.

Hereinafter, a medium can be a beverage (e.g., beer, milk, sparkling fruit juice, fruit juice, etc.), food (e.g., a liquid or substantially liquid, for example, mushy product), a liquid or substantially liquid feed, or other liquids (e.g., vinegar, fish sauce, etc.).

In the devices described below, media is moved in a flow direction through the device. A second element connected downstream of a first element is therefore disposed downstream in the flow direction and, correspondingly, a second element upstream of a first element is upstream in the flow direction.

The device for pasteurizing and filling medium into containers may include a short time heating system for pasteurizing the medium, a single buffer container downstream of the short time heating system for receiving the medium, and a rotary filling device downstream of the buffer container with at least one filling valve for filling the container with the medium. The filling device is connected in a buffer-free manner to the buffer container.

In this context, a rotary filling device is understood to mean continuous or quasi-continuous rotating or turning filling systems. The filling systems may include at least two filling valves which are arranged on the circumference of the filling device. The at least two filling valves (e.g., all filling valves) may be distributed equidistantly on this circumference of the filler carousel.

Due to the fact that the filling device is connected in a buffer-free manner to the single buffer container, one of the two typical buffer containers (vessel, buffer tank) common in conventional devices for pasteurizing and filling can be dispensed with. The overall buffered volume of medium can therefore be reduced, resulting in improved efficiency of the device, since less or no medium at all must be discarded at the end of the filling or during a change of medium. Also, less space is required for the device due to the fact that one of the typical buffer containers is saved.

Buffer-free is presently understood to mean that no dedicated device is present which enables the buffering reception of medium, for example, during production breaks or in the event of failure of the filling device. A buffer container is presently not understood to mean the piping/supply lines generally present through which the medium flows and which are filled with the medium during the filling operation either over their entire cross-section or at least over a part of their cross-section. Also, a loop or a ring channel in a filler carousel, which supplies the respective filling valves with medium, is not a buffer container according to the present understanding, since it is completely filled with liquid and can therefore not accommodate any further volume.

A buffer container is instead understood to be only a dedicated buffer reservoir provided as such, which provides a respective buffer volume. The buffer container can therefore receive a substantial amount of additional medium that accumulates during breaks of the filling operation or in the event of system failure and cannot be removed directly from the filling device. The buffer container can therefore always have a space free of medium, also called headspace, above its filling level, which is intended to receive additional medium.

Disposed between the filling device and the buffer container are only pipes (also referred to as supply lines) and/or one or more rotary distributors. The rotary distributor can be provided for transferring the medium from a stationary part of the device, in which, for example, the buffer container and a filling line are provided, to a filler carousel rotating relative thereto. The rotary distributor can pass the medium or carbon dioxide supplied via the supply line to further supply lines at the filler carousel, where the further supply lines then forward the medium or the carbon dioxide to the filling valves.

In addition to the piping and/or the one or more rotary distributors, flow meters, sensors, valves and/or control devices can also be provided.

In a first embodiment, the single buffer container can be formed as a vessel or ring container of the filling device. A ring container is understood to be an annular buffer container that is not completely filled with medium and has a headspace for receiving additional medium.

In a second embodiment, the single buffer container can be formed as a buffer tank of the short time heating system.

Both embodiments offer the possibility that only a single buffer container is provided and that not both a vessel and a buffer tank must be provided.

The filling device can include a proportional valve for controlling and/or regulating a filling flow of medium into the containers, where the proportional valve may be configured to control and/or regulate various predetermined filling flows and/or to control and/or regulate stepless filling flows.

The proportional valve can include electronic control components that can be installed remotely in each filling valve of the filling device. The filling flows, e.g. their flow rate, can be adjusted in a freely selectable manner, i.e. steplessly, by way of the proportional valve. An optimal adaptation to different combinations of the type of medium and the type of container is then possible.

A preloading device for preloading the buffer container with carbon dioxide or with a carbon dioxide-nitrogen mixture can be provided.

Preloading the buffer container can be required so that carbon dioxide dissolved in the medium does not gas out and the medium is not impaired by ambient air.

The short time heating system can include a primary circuit for the medium and a secondary circuit, where the secondary circuit serves as a heating circuit to heat the medium in the primary circuit.

The primary circuit can run through a first heat exchanger, a second heat exchanger connected downstream of the first heat exchanger, and a heat retention section downstream of the second heat exchanger, and the secondary circuit can run through the second heat exchanger and a third heat exchanger.

In such a two-stage short time heating system, medium to be pasteurized can be heated in the first heat exchanger (recuperator) by the medium that flows out from the heat retention section and has already been pasteurized. In the second heat exchanger (heater), the heated medium to be pasteurized is heated in the primary circuit to the final pasteurization temperature which then remains substantially constant in the heat retention section. The length of the heat retention section and the flow rate of the medium determine the duration of the short time heating. The pasteurized medium subsequently flows through the first heat exchanger, where it gives off its heat to the medium to be pasteurized flowing in countercurrent. The pasteurized medium cooled to a final temperature can flow into the buffer container.

The short time heating system further includes a cooling circuit which can be in thermal contact with the primary circuit via a fourth heat exchanger. In such a three-stage short time heating system, the pasteurized product can flow through the fourth heat exchanger in countercurrent to a coolant and thereby be further cooled.

The device can further include a control device.

When filler performance of the filling device is reduced, the control device can be configured to reduce performance of the short time heating system in proportion to the filler performance (e.g., up to 50% of a rated performance of the short time heating system).

When filler performance of the filling device is increased, the control device can further or alternatively be configured to increase the performance of the short time heating system in proportion to the filler performance (e.g., up to the rated performance of the short time heating system).

The control device can further or alternatively be configured to control the short time heating system such that a filling level in the buffer container is in a range (e.g., in a range of 10%, or in a range of 5%) of the container volume of the buffer container. It can be achieved thereby that the filling level remains constantly low.

Controlling the performance of the short time heating system can be effected indirectly via the filling level of the buffer container or directly via the filler performance Filler performance can be understood to mean either a quantity of containers filled per unit time, via which the filled quantity of medium can be calculated with the aid of the container size, or the sum of all mass flows of the filling valves.

The control device can further or alternatively be configured to control a maximum filling level of the buffer container in such a way that no measurable and/or gustatory impairment of the medium occurs in the event of mixing with the possibly overpasteurized medium of the device. In some embodiments, the ratio between the system content (product side) and a container volume of the buffer container can be between 0.05:1 and 0.5:1. In some embodiments the ratio between the system content and the container volume of the buffer container is between 0.1:1 and 0.3:1.

The control device can further or alternatively be configured to perform a defined overflow of the medium back into an inlet of the short time heating system. Defined overflow means that a portion of the pasteurized medium (i.e., medium that has already passed through the short time heating system), is returned to the inlet of the short time heating system before it is fed to the filling process. This part of the pasteurized medium can either be returned prior to entry into the buffer container or after it has been supplied to the buffer container. The defined overflow offers the advantage, for example, that the supply of medium into the inlet of the short time heating system can be reduced to a level below a minimum performance. The short time heating system is then operated at a performance corresponding to the minimum performance, but a portion of the pasteurized medium is always returned into the inlet of the short time heating system before it is supplied to the filling process. The amount of medium flowing into the buffer device is thereby reduced to a level which is below the minimum performance of the short time heating system. The time until a maximum filling level of the buffer container is reached can thereby be significantly extended, e.g. when removal by the filling system is stopped.

When the short time heating system includes a primary circuit, a secondary circuit and a heat retention section, then the control device can further or alternatively be configured to perform temperature control and keep a predetermined number of pasteurization units (PUs) of the medium constant.

Temperature control within the meaning of the present disclosure is understood to mean that the temperature of the second heat exchanger, and thereby the temperature of the heat retention section, are adapted in dependence of the performance of the short time heating system. Reduced performance or a reduced mass flow of medium can thereby lead to an increased residence time in the heat retention section. In order to prevent the overpasteurization associated therewith, the temperature of the second heat exchanger is in turn lowered. With reduced performance of the short time heating system, the number of PUs therefore remains the same.

The control device can further or alternatively be configured to maintain a temperature of the heat retention section and reduce a flow of medium.

The control device can further or alternatively be configured to operate the short time heating system at a minimum performance when the filling device stops (e.g., operate at 50% of the rated performance) and/or to carry out a defined overflow of the medium back into an inlet of the short time heating system, to fill the buffer container up to a maximum level, to stop the supply of medium to the device when the maximum filling level has been reached, to stop the primary circuit under defined conditions (e.g., while maintaining the pressure in the short time heating system), to continue operating the secondary circuit of the second heat exchanger and successively increase the temperature of the secondary circuit in order to compensate for the loss of energy in the primary circuit when restarting. The pressure in the short time heating system may be above the saturation pressure.

A successive increase in the temperature of the secondary circuit can be effected up to a maximum temperature which depends on the medium, where the maximum temperature is below a temperature above which irreversible damage is done to the medium that entails, for example, a change of taste, and/or that depends on the device and can be defined by a maximum allowable operating temperature and/or by the temperature of the steam used for heating the secondary circuit in the heater.

By operating the secondary circuit (e.g., after stopping the flow of the medium in the primary circuit) the heating medium in the secondary circuit of the second heat exchanger can continue to be heated and/or be maintained at a predetermined temperature. This creates a heat barrier between the two hygiene regions of the system.

If the temperature of the heat retention section drops below a minimum value after the flow of medium in the primary circuit stops, then the primary circuit can be restarted for a predetermined period of time. The minimum value can correspond to a temperature which still makes it possible for the medium in the primary circuit to be reheated by the secondary circuit. However, the medium is then not passed into the buffer container, but back into the inlet of the short time heating system. Due to this circuit passage or internal circulation, the original state of the temperatures in the second heat exchanger and in the heat retention section is restored. Once this state is obtained, the primary circuit can again be stopped.

The control device can further or alternatively comprise a counter for summing PUs that are received by the medium. It can thereby be possible to determine overpasteurization of the product, e.g. at standstill of the primary circuit. A partial summation of PUs per volume can then be effected. However, it is also possible to sum up a number of PUs, averaged over the entire system content (primary side).

The control device can further be configured to discard medium or to mix it with the contents of the buffer container when the supply of medium to the device stops either after a predetermined standstill period has expired or after a summed number of PUs has been exceeded. Mixing may be effected such that it has no measurable effect on product quality, for example, by controlling a mixing ratio of the medium in the buffer container and the medium supplied. The maximum number of PUs can be a predetermined percentage above the regular number of PUs during normal system operation. This percentage may depend on the size of the buffer container and the size of the system as well as on customer requirements.

The buffer container can be provided with guide devices or guide elements, such as baffles. As a result, efficient mixing of medium flowing into the buffer container with the medium which is already in the buffer container can be obtained.

The filling device can be a filler carousel with filling valves which may be configured as proportional valves.

The filling level in the buffer container can be above the filling device (e.g., above the filling valve). An efficient flow through the filling valve may be obtained due to the hydrostatic pressure. In some embodiments, the filling level is in the range between 0.5 meters (m) and 10 m above the filling valve. In some embodiments, the filling level is in the range between 2 and 4 m above the filling valve.

The buffer container can be configured as a lying or horizontal tank.

In a method for pasteurizing and filling medium into containers, the containers are filled with the medium by use of a device as described above or below in a buffer-free manner by way of the filling device.

The method can include: pasteurizing the medium in the short time heating system, then buffering the pasteurized medium in the buffer container, and then filling the pasteurized medium into the containers, where the pasteurized medium is transported in a buffer-free manner from the buffer container to the filling device.

FIG. 1 shows a first embodiment of a device for pasteurizing and filling medium into containers 21. Short time heating system 11 is supplied medium to be treated by way of a first inlet 1. A further medium is supplied by way of a second inlet 2 to the short time heating system 11. This further medium may be water. The second inlet 2 is intended to start up operation of the system and to push out the product still remaining in the system after the end of production. The medium to be treated passes through a first valve 3 into a primary circuit of short time heating system 11. The medium flows through a first heat exchanger (recuperator) 5 and then to and through a second heat exchanger (heater) 6 downstream of first heat exchanger 5. The medium then flows through a heat retention section 7 before it passes through recuperator 5 in countercurrent to the influent medium and arrives at a second valve 12.

Heating medium, such as water, that has been heated can flow in a secondary circuit of short time heating system 11, whereby the secondary circuit can serve as a heating circuit. The heating medium flows through heater 6 where it can give off energy, and through a third heat exchanger (hot water heater) 10 where it can absorb energy. The hot water heater 10 can be in thermal contact with a steam-condensate circuit in which steam can be introduced via a third valve 8 and condensate can be discharged via a fourth valve 9. For example, water vapor can be used.

From the second valve 12, the medium can flow into a collection container 13, e.g. in order to be disposed of, back to first valve 3 and/or to a buffer container 14.

Optionally (indicated by the dotted line), a carbonating apparatus 15 can be disposed downstream of the short time heating system 11 for introducing carbon dioxide into the medium before it enters the buffer container 14, where the carbonating apparatus 15 is presently provided between the short time heating system 11 and the buffer container 14.

To avoid absorption by the medium in the buffer container 14 of ambient air from the headspace 17 of the buffer container 14 or to avoid release of carbon dioxide already present in the medium or optionally absorbed from the medium, a preloading device 16 is provided for preloading the buffer container 14 with carbon dioxide.

Carbon dioxide can be introduced by the preloading device 15 into the headspace 17 of the buffer container 14. Carbon dioxide can be supplied from a carbon dioxide storage 18. Since return gas from filling valves 19 of the filling device 20 downstream of the buffer container 14 can accumulate in the headspace 17 of the buffer container 14, ambient air can accumulate in the headspace 17 of the buffer container 14 during operation of the device. The buffer container 14 can therefore additionally be configured to allow the headspace 17 to be flushed with carbon dioxide.

In addition, carbon dioxide can be passed to the filling device 20 by way of a gas supply line 25.

It can also be intended to use a preloading direction which operates with a carbon dioxide-nitrogen mixture. The preloading direction can then be additionally supplied with nitrogen or a carbon dioxide-nitrogen storage can be provided.

The medium passes from the buffer container 14 directly to the filling device 20. Due to the direct connection by way of a medium supply line 22 between the buffer container 14 and the filling device 20, buffering of medium in this region is not intended nor is it possible.

Conventional supply lines are not understood to be a buffer container within this context. The buffer container is presently understood to mean only a dedicated reservoir configured as a buffer which has a corresponding buffer volume that is not used solely for transporting the medium, but enables buffering the medium.

The filling valve 19 is provided on a schematically indicated filling device 20, which is illustrated as a filler carousel, on the circumference of which a plurality of filling valves 19 is typically arranged. A filler carousel is typically provided in beverage filling systems to receive a steady flow of containers 21 to be filled, to fill them with the medium during circulation by use of the respective filling valves 19, and then to discharge the filled containers 21 to a downstream transport or processing device.

A rotary distributor 23 is provided for transferring the medium from a stationary system part of the device, in which inter alia the buffer container 14, the medium supply line 22 and the gas supply line 25 are provided, to the filling device 20 rotating relative thereto. The rotary distributor 23 accordingly transfers the medium supplied from the medium feed line 22 into a first filling line 24 and the carbon dioxide supplied from the gas feed line 25 into a second filling line 26 to the filling device 20, with which the medium and the carbon dioxide are then passed to the filling valve 19.

In order to allow venting of a container 21 filled with carbonated medium at the filling valve 19 before removing the container 21 from the filling valve 19, a degassing line 27 is provided which leads via a further rotary distributor 28 to the exhaust air.

Optionally (indicated by the chain dotted line), the first embodiment of the device can further include a return line 29, which is downstream of the buffer container 14 and emanates from the medium supply line 22 and leads to a supply line between a second valve 12 and the buffer container 14. This return line 29 is provided for the event that the medium (e.g., beer) is additionally carbonated before entering the buffer container. Carbonation can then be performed with a Venturi nozzle. Since the Venturi nozzle requires a constant volume flow for optimum operation, while this cannot be guaranteed e.g. at reduced performance, a portion of the medium is circulated out of the buffer container.

FIG. 2 shows a second embodiment of a device for pasteurizing and filling medium into containers. Compared to the first embodiment, short time heating system 30 also, in addition to the elements of the short time heating system of the first embodiment of the device, includes a cooling circuit which is in thermal contact via a fourth heat exchanger (cooler) 31 with the primary circuit in the region between recuperator 5 and second valve 12, whereby, for example, pasteurized medium can be cooled. Coolant can be introduced into the cooling circuit via a fifth valve 32 and, after flowing through a cooler 31, can be discharged via a sixth valve 33.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A device for pasteurizing and filling medium into filling containers, the device comprising:
   a short time heating system comprising one or more heat exchangers to pasteurize the medium;
   a single buffer container disposed downstream from the short time heating system to receive the pasteurized medium;
   a rotary filling device disposed downstream from the single buffer container, wherein the rotary filling device is in communication with the single buffer container without presence of an additional buffer container, wherein the rotary filling device further comprises:
      a rotary distributor configured to: transfer the pasteurized medium from a medium supply line to a first filling line; and transfer gas from a gas supply line to a second filling line;
      a filler valve configured to fill the filling containers, wherein the filler valve is configured to receive the pasteurized medium from the first filing line and to receive the gas from the second filling line; and
      a degassing line provided for degassing and being coupled to the filler valve.

2. The device of claim 1, wherein the single buffer container is a vessel or ring container of the rotary filling device.

3. The device of claim 1, wherein the single buffer container is a buffer tank of the short time heating system.

4. The device of claim 1, wherein the short time heating system comprises:
   a primary circuit for the medium;
   a secondary circuit, wherein the secondary circuit is a. heating circuit to heat the medium in the primary circuit;

a first heat exchanger, wherein the primary circuit runs through the first heat exchanger;

a second heat exchanger connected downstream from the first heat exchanger;

a heat retention section downstream from the second heat exchanger;

a third heat exchanger, wherein the secondary circuit runs through the second heat exchanger and the third heat exchanger;

a cooling circuit; and a fourth heat exchanger, wherein the cooling circuit is in thermal contact with the primary circuit via the fourth heat exchanger.

5. The device of claim 4, further comprising a control device configured to:

overflow the medium into an inlet of the short time heating system;

fill the single buffer container up to a maximum filling level;

stop supply of the medium to the device responsive to filling the single buffer container to the maximum filling level;

stop the primary circuit under defined conditions; and continue operating the secondary circuit of the second heat exchanger and successively increase temperature of the secondary circuit to compensate for loss of energy in the primary circuit when restarting, wherein pressure in the short time heatin system is to be maintained above a saturation pressure.

6. The device of claim 4, further comprising a control device configured to restart the primary circuit for a predetermined period of time responsive to a first temperature of the heat retention section dropping below a minimum value after flow of the medium in the primary circuit has stopped, wherein the minimum value corresponds to a second temperature for reheating the medium in the primary circuit by the secondary circuit.

7. The device of claim 1, wherein the rotary filling device comprises a proportional valve for at least one of controlling or regulating filling flows to fill the pasteurized medium into one or more of the filling containers.

8. The device of claim 7, wherein the proportional valve is to at least one of control or regulate predetermined filling flows or stepless filling flows to fill the pasteurized medium into the one or more of the filling containers.

9. The device of claim 1, wherein the rotary filling device is a filler carousel.

10. The device of claim 1 further comprising a preloading device to preload the single buffer container with at least one of carbon dioxide or a carbon dioxide-nitrogen mixture.

11. The device of claim 1, further comprising a control device configured to reduce performance of the short time heating system up to 50% of a rated performance of the short time heating system in proportion to performance of the rotary filling device responsive to the performance of the rotary filling device being reduced.

12. The device of claim 1, further comprising a control device configured to increase performance of the short time heating system up to a rated performance of the short time heating system in proportion to performance of the rotary filling device responsive to the performance of the rotary filling device being increased.

13. The device of claim 1, further comprising a control device configured to control a maximum filling level of the single buffer container to prevent at least one of measurable or gustatory impairment of quality of the medium responsive to mixing the medium with overpasteurized medium, wherein a ratio between content of the short time heating system and a container volume of the single buffer container is between 0.05:1 and 0.5:1.

14. The device of claim 1, further comprising a control device configured to at least one of:

perform temperature control and maintain constant a predetermined number of pasteurization units (PUs) of the medium; or perform a defined overflow of the medium back into an inlet of the short time heating system.

15. The device of claim 1, further comprising a control device configured to operate the short time heating system at a minimum performance responsive to the rotary filling device stopping, wherein the minimum performance is an operation at 50% of a rated performance of the short time heating system.

16. The device of claim 1, further comprising a control device comprising a counter, wherein the counter is to sum pasteurized units (PUs) that are received by the medium.

17. The device of claim 16, wherein the control device is configured to discard the medium or mix the medium with contents of the single buffer container responsive to supply of the medium to the device stopping after a. predetermined standstill period has expired or after a summed number of PUs exceeds a threshold number of PUs.

18. The device of claim 1, wherein the single buffer container comprises one or more of guide devices, guide elements, or baffles.

19. The device of claim 1, wherein a filling level of the single buffer container is above the filler valve of the rotary filling device.

20. A method comprising:

pasteurizing a medium in a short time heating system comprising one or more heat exchangers;

receiving the pasteurized medium in a single buffer container disposed downstream from the short time heating system;

buffering the pasteurized medium in the single buffer container;

transporting the pasteurized medium in a buffer free manner from the single buffer container to a rotary filling device disposed downstream from the single buffer container, wherein the rotary filling device is in communication with the single buffer container without presence of an additional buffer container, wherein the rotary filling device further comprises a rotary distributor configured to: transfer the pasteurized medium from a medium supply line to a first filling line; and transfer gas from a gas supply line to a second filling line via; and filling the pasteurized medium into filling containers using a filler valve of the rotary filling device, wherein the filler valve is configured to receive the pasteurized medium from the first filing line and to receive the gas from the second filling line, and wherein a degassing line is provided for degassing and is coupled to the filler valve.

* * * * *

UNITED STATES PATENT AND TRADEMARK OFFICE
CERTIFICATE OF CORRECTION

PATENT NO. : 11,224,240 B2
APPLICATION NO. : 15/980312
DATED : January 18, 2022
INVENTOR(S) : Roland Feilner et al.

It is certified that error appears in the above-identified patent and that said Letters Patent is hereby corrected as shown below:

In the Claims

In Claim 5, Column 9, Line 29, delete "heatin" and insert --heating--

Signed and Sealed this
Sixteenth Day of May, 2023

Katherine Kelly Vidal
Director of the United States Patent and Trademark Office